United States Patent [19]
Miyamoto et al.

[11] Patent Number: 5,826,114
[45] Date of Patent: Oct. 20, 1998

[54] CAMERA EQUIPPED WITH A DEVICE FOR FOCUS ADJUSTMENT DURING TIMES OF CAMERA VIBRATION AND THE LIKE

[75] Inventors: Hidenori Miyamoto, Urayasu; Minoru Kato; Junichi Omi, both of Kawasaki; Isao Soshi, Tokyo, all of Japan

[73] Assignee: Nikon Corporation, Tokyo, Japan

[21] Appl. No.: 801,184

[22] Filed: Feb. 18, 1997

Related U.S. Application Data

[63] Continuation of Ser. No. 378,243, Jan. 25, 1995, abandoned.

[30] Foreign Application Priority Data

Apr. 8, 1994 [JP] Japan .................................. 6-093946
Apr. 15, 1994 [JP] Japan .................................. 6-077351

[51] Int. Cl.$^6$ ............................ G03B 5/00; G03B 13/34
[52] U.S. Cl. ............................... 396/55; 396/87; 396/133
[58] Field of Search ................................. 396/52, 53, 55, 396/85, 87, 131, 133, 134, 144; 359/696, 697, 698, 823, 824

[56] References Cited

U.S. PATENT DOCUMENTS

| | | | |
|---|---|---|---|
| 4,721,972 | 1/1988 | Wakabayashi . | |
| 5,144,494 | 9/1992 | Sekiguchi | 354/195.12 |
| 5,255,035 | 10/1993 | Kichima | 354/195.12 |
| 5,307,103 | 4/1994 | Machida | 354/195.12 |
| 5,323,199 | 6/1994 | Yoshida | 354/195.12 |
| 5,329,329 | 7/1994 | Fukushima et al. | 354/195.12 |
| 5,337,098 | 8/1994 | Imafuji et al. | 354/70 |
| 5,371,566 | 12/1994 | Asakura | 354/400 |
| 5,402,197 | 3/1995 | Okano et al. | 354/195.1 |
| 5,416,558 | 5/1995 | Katayama et al. | 354/195.1 |
| 5,420,721 | 5/1995 | Kanno et al. | 354/195.12 |
| 5,463,443 | 10/1995 | Tanaka et al. | 354/430 |
| 5,592,335 | 1/1997 | Omi et al. | 359/696 |
| 5,602,675 | 2/1997 | Okada | 396/55 |

Primary Examiner—A. A. Mathews

[57] ABSTRACT

A camera includes, but is not limited to, a focus adjustment optical system such as a zoom or a non-zoom type optical system, for example, an actuator generating a drive force which moves the focus adjustment optical system, a transmission mechanism transmitting the drive force from the actuator to the focus adjustment optical system, a drive amount detection mechanism detecting an amount of drive of the focus adjustment optical system caused by the actuator; and wherein the actuator, the transmission mechanism and the drive amount detection mechanism are disposed in the camera in a position which is on the outer circumference of the aforementioned focus adjustment optical system and which is on a long side of an aperture that forms light fluxes into a rectangular shape to become incident on a film surface. Also provided is a camera that includes, but is not limited to, a variable power device conducting focus distance variable power operations based on multiple photographic lens groups by moving the multiple photographic lens groups in a direction of their optical axes, a vibration detection device to detect a vibration and to generate vibration signals in relation thereto, a vibration compensation device to correct vibration corresponding to the vibration detection signals from the vibration detection device and wherein the variable power device houses the vibration compensation device inside a main cover of a camera body when the camera is not in use and wherein the vibration compensation device is made to extend to a position outside of the main cover of the camera to a specified region when the camera is in use. Finally, a camera is provided that includes, but is not limited to, a lens groups positioned along an optical axis, a drive device changing a distance between a first lens group of the lens groups and the lens groups. The drive device includes an actuator and a displacement transmission device. The drive device is positioned in the camera along an exterior circumference of a second lens group of the lens groups. The second lens group is closest to an image forming plane.

12 Claims, 14 Drawing Sheets

CAMERA EQUIPPED WITH A DEVICE FOR FOCUS ADJUSTMENT DURING TIMES OF CAMERA VIBRATION AND THE LIKE

This application is a continuation of application Ser. No. 08/378,243, filed Jan. 25, 1995, now abandoned.

BACKGROUND OF THE INVENTION

1. Field of the Invention

The present invention is related to a camera that conducts focus adjustment by driving a focus adjustment optical system using an actuator during times of vibration and the like.

2. Description of the Related Art

In conventional cameras, an actuator to drive a focus adjustment optical system, a transmission mechanism to transmit that drive force to the focus adjustment optical system, or a mechanism to detect the amount of drive and position of the focus adjustment optical system are positioned towards an aperture side provided in a location separate from a photographic lens, and also, in a location on the short side of the aperture. The term "aperture" as used herein refers to a device which by the cross-sectional shape of the light fluxes that are incident from the photographic lens are formed in a rectangular shape of a size corresponding to the exposure plane of a film surface. "Focal point adjustment" as that term is used in the industry constitutes a focus adjustment method.

When the aforementioned kinds of mechanisms and actuators are provided between the photographic lens and the aperture, it is necessary to sufficiently distance these mechanisms from the optical axis so that the light fluxes which are incident from the photographic lens and are conducted to the aperture are not blocked. Meanwhile, it is preferable in terms of dynamic transmission loss and of making a compact mechanism that the actuator and the transmission mechanism be arranged in a concentrated way in a position as close to the focus adjustment optical system as possible. It is also preferable that the mechanism to detect the amount of drive for the focus adjustment optical system be adjacent to the actuator and the transmission mechanism because the usual configuration is to detect the rotational frequency of the output axis of the motor that functions as the actuator. In order to fulfill these conditions, it is necessary to guarantee sufficient installation space by consolidating the actuator and these mechanisms in a location greatly separated from the optical axis of the photographic lens, and this produces wasted space in the layout because the short side of the aperture has little space leeway, and it is unavoidable that the scale of the camera increases if the space is to be guaranteed.

Additionally, typical cameras of every kind from single lens reflex cameras to compact cameras have incorporated a high degree of automation by adding electronics to every part, such as automatic exposure (AE) mechanisms and automatic focus (AF) mechanisms. One of these automated functions as suggested above is a compensation function for image vibration such as that caused by hand vibration produced during hand-held photography and the like. Accordingly, a variety of proposals and solutions have been made to provide devices which are capable of performing such compensation.

Moreover, in the past there have been vibration control devices proposed that have a configuration such that in order to correct image vibration produced by camera shake and the like, in particular, produced by the camera vibrating and being tilted, the shaking conditions of the camera are detected by a vibration detection means, and the vibration compensation optical system, which may be the photographic lens system or main optical system or one part of that optical system, is shifted and moved in a direction generally perpendicular to the optical axis based upon vibration detection results.

Additionally, in the past, cameras equipped with the aforementioned kinds of vibration compensation functions have included single lens reflex cameras equipped with interchangeable lens barrels.

Moreover, cameras with the aforementioned kinds of vibration compensation function have also been equipped with zoom type lens barrels which incorporate both the vibration compensation device described above and a variable power device to control, at variable powers, the focus distance based on the photographic optical system within the lens barrel.

Nonetheless, in a camera equipped with a vibration compensation function as described above, when incorporating both a vibration compensation device and a matching variable power device into a lens barrel, it is easy for the lens barrel, as a whole, to become physically quite large, and, as such, the resulting camera and its case cannot be made compact.

For example, if a vibration compensation device is incorporated into an interchangeable lens barrel as described above, the camera cannot be made compact because the vibration compensation device is arranged in a position which extends out from the main cover of the camera body. More particularly, this kind of problem becomes that much greater when installing and incorporating a variable power device into a lens barrel.

For the aforementioned reasons, there have been proposals to make the entire camera compact with the lens barrel part being configured so that the vibration compensation device described above is arranged within the camera body. However, the problem with incorporating a lens barrel part which includes the aforementioned kind of vibration compensation device within the camera body is that, if a variable power device is provided in the lens barrel and made to be the zoom type, the distance to the film exposure plane cannot be guaranteed (i.e., the proper amount of space within a camera body cannot be assured). For example, when incorporating a device capable of executing telephotography, this invites the problem that the entire camera becomes altogether larger. Therefore, it is desirable to enact some kind of countermeasure when providing this kind of variable power device.

Moreover, what is desirable in configuring a camera with the vibration compensation function described above is that the vibration compensation lens drive mechanism of the vibration compensation device be one that can execute precise and sensitive operations, and because errors may be produced by malfunction and damage problems that may arise from the camera being impacted from the outside during times of non-use, counter measures are needed for these problems as well.

SUMMARY OF THE INVENTION

Accordingly, it is therefore an object of the present invention to solve the aforementioned and other problems of prior art cameras and imaging devices.

It is a particular object of the present invention to provide a compact camera that effectively uses space around an optical system (i.e., vibration compensation device) to provide other features.

It is still another particular object of the present invention to provide a camera having a lens barrel in which a photographic lens group incorporates both a variable power device and a vibration compensation device.

Objects and advantages of the present invention are achieved by providing a camera that includes, but is not limited to, a focus adjustment optical system, an actuator generating a drive force which moves the focus adjustment optical system, a transmission mechanism transmitting the drive force from the actuator to the focus adjustment optical system, a drive amount detection mechanism detecting an amount of drive of the focus adjustment optical system caused by the actuator; and wherein the actuator, the transmission mechanism and the drive amount detection mechanism are disposed in the camera in a position which is on the outer circumference of the aforementioned focus adjustment optical system and which is on a long side of an aperture that forms light fluxes into a rectangular shape to become incident on a film surface.

Objects and advantages of the present invention are further achieved by providing a camera that includes, but is not limited to, a variable power device conducting focus distance variable power operations based on multiple photographic lens groups by moving the multiple photographic lens groups in a direction of their optical axes, a vibration detection device to detect a vibration and to generate vibration signals in relation thereto, a vibration compensation device to correct vibration corresponding to the vibration detection signals from the vibration detection device and wherein the variable power device houses the vibration compensation device inside a main cover of a camera body when the camera is not in use and wherein the vibration compensation device is made to extend to a position outside of the main cover of the camera to a specified region when the camera is in use.

Finally, other objects and advantages of the present invention are achieved by providing a camera that includes, but is not limited to, lens groups positioned along an optical axis, a drive device changing a distance between a first lens group of the lens groups and the lens groups. The drive device includes an actuator and a displacement transmission device. Also, the drive device is positioned in the camera along an exterior circumference of a second lens group of the lens groups. The second lens group is closest to an image forming plane.

BRIEF DESCRIPTION OF THE DRAWINGS

The aforementioned and other objects and advantages of the present invention will become apparent and readily appreciated from the following description of the preferred embodiments, taken in conjunction with the accompanying drawing figures, of which.

DETAILED DESCRIPTION OF THE PREFERRED EMBODIMENTS

Figure 1:
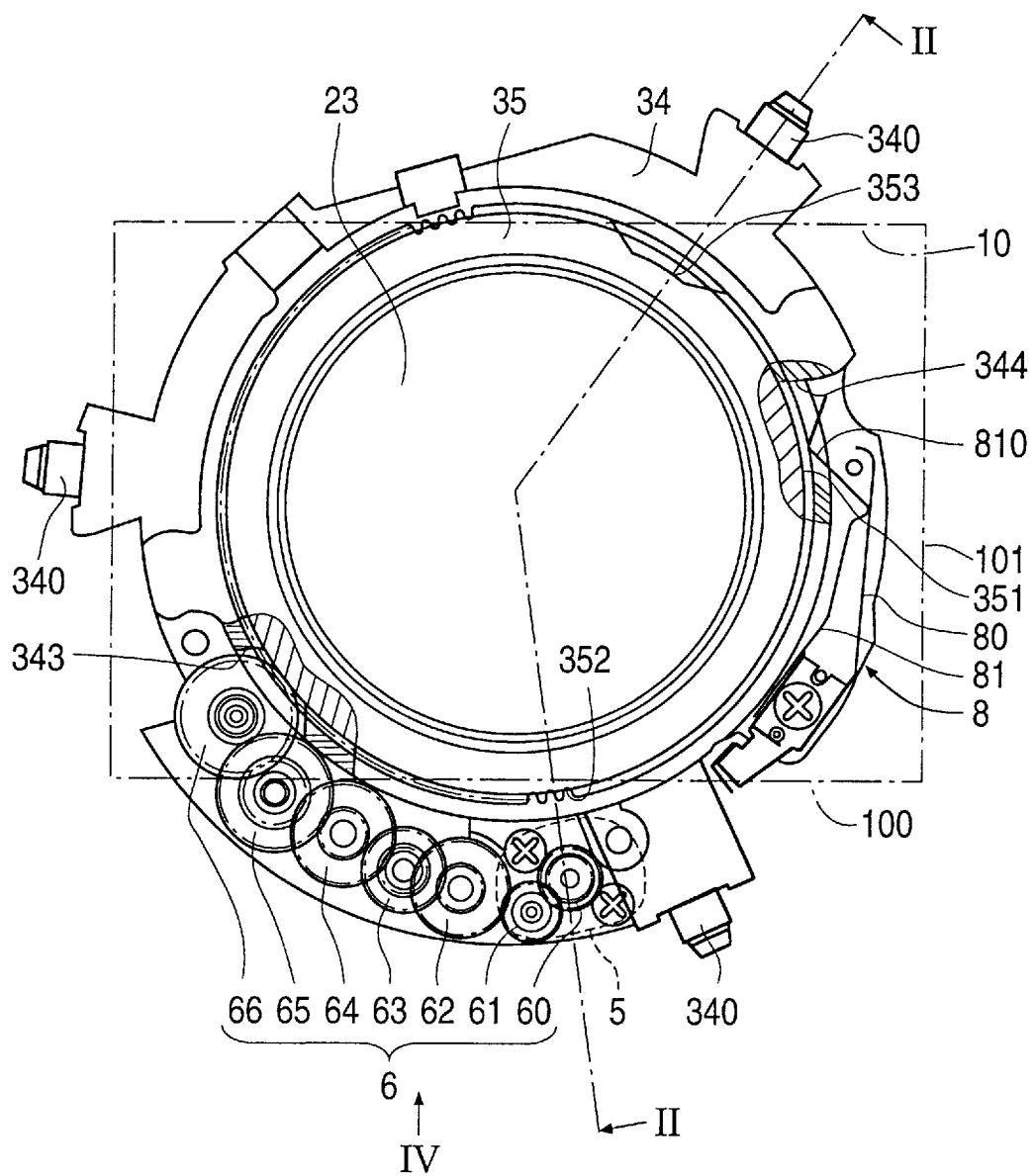
FIG. 1 is a diagram of a front view of a third lens group and the surrounding area thereof of a camera related to a first embodiment of the present invention.

The following description is provided in reference to the drawing figures which were briefly described above. Like parts are referred to by like reference numerals.

It is to be understood that while a film-based camera is used as the preferred and exemplary embodiment described herein according to the invention, the present invention is not so limited. In fact, the present invention, as described herein and defined in the appended claims, is applicable to other imaging devices such as video motion and video still camera arrangements (e.g., imaging devices). By the term "camera," it is to be expressly understood that the present invention is directed to any device that is capable of capturing still or moving images and storing or recording those images on some form of media (e.g., a film, a digital recording medium such as a magnetic medium, etc.).

Moreover, it is important to note that the optical systems and focus adjustment optical systems mentioned herein are meant to include those optical and lens systems which may or may not incorporate moving barrels and/or zooming qualities. The present invention is applicable to zoom type lens systems.

Referring now to FIGS. 1 through 11, therein depicted are several views of a first embodiment of the present invention.

Figure 7:
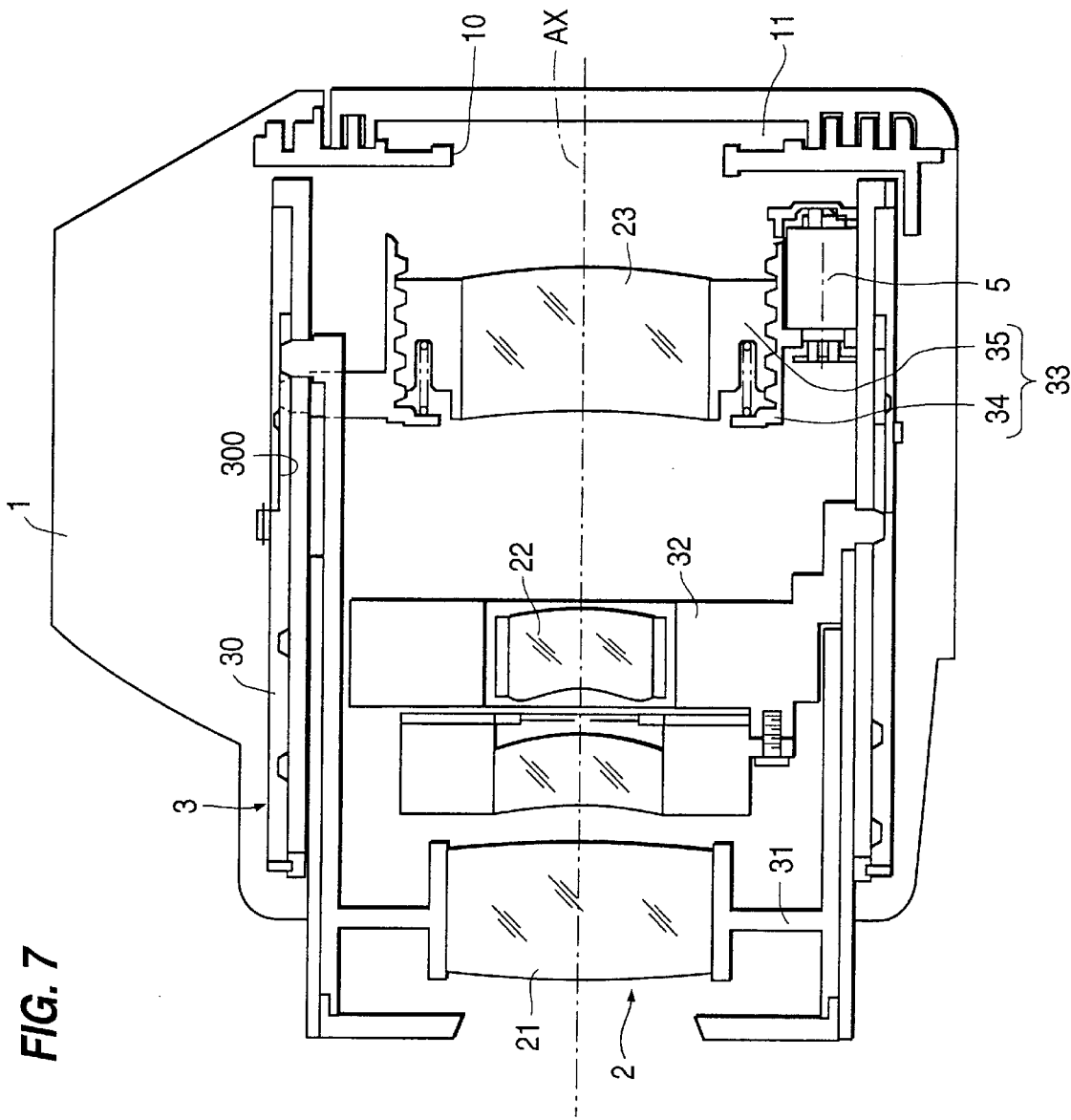
FIG. 7 is a vertical cross-sectional diagram along the direction of the optical axis of a camera relating to the first embodiment depicted in FIG. 1.

First, a summary of the photographic optical system of a camera according to an embodiment of the present invention will be explained referring to FIG. 7. As shown in FIG. 7, the camera includes a camera body 1, a photographic lens 2, and a lens barrel 3. On the back side of the interior part of camera body 1 (on the right of the diagram), aperture 10 has a cross-sectional rectangular shape to form the light fluxes which are incident from photographic lens 2. On the back side of the camera body 1 is provided a transit part 11 for the film, which is not indicated in the diagram. Additionally, aperture 10 is indicated by two dotted lines in FIG. 1 and FIG. 3 which are explained below.

Photographic lens 2 includes, but is not to be limited to, three lens groups of first lens group 21, second lens group 22, and third lens group 23. Lens barrel 3 is equipped with outer barrel 30, which is installed in the interior of camera body 1, and three lens retention barrels 31, 32, and 33 are provided so as to be mutually, independently moveable in the direction of the optical axis (direction of axis AX) in relation to outer barrel 30. First lens group 21 is installed in lens retention barrel 31, second lens group 22 is installed in lens retention barrel 32, and third lens group 23 is installed in lens retention barrel 33.

When lens retention barrels 31–33 move mutually and independently in the direction of the optical axis, the focus distance of photographic lens 2 varies by varying the intervals between the three lens groups 21–23.

Figure 2:
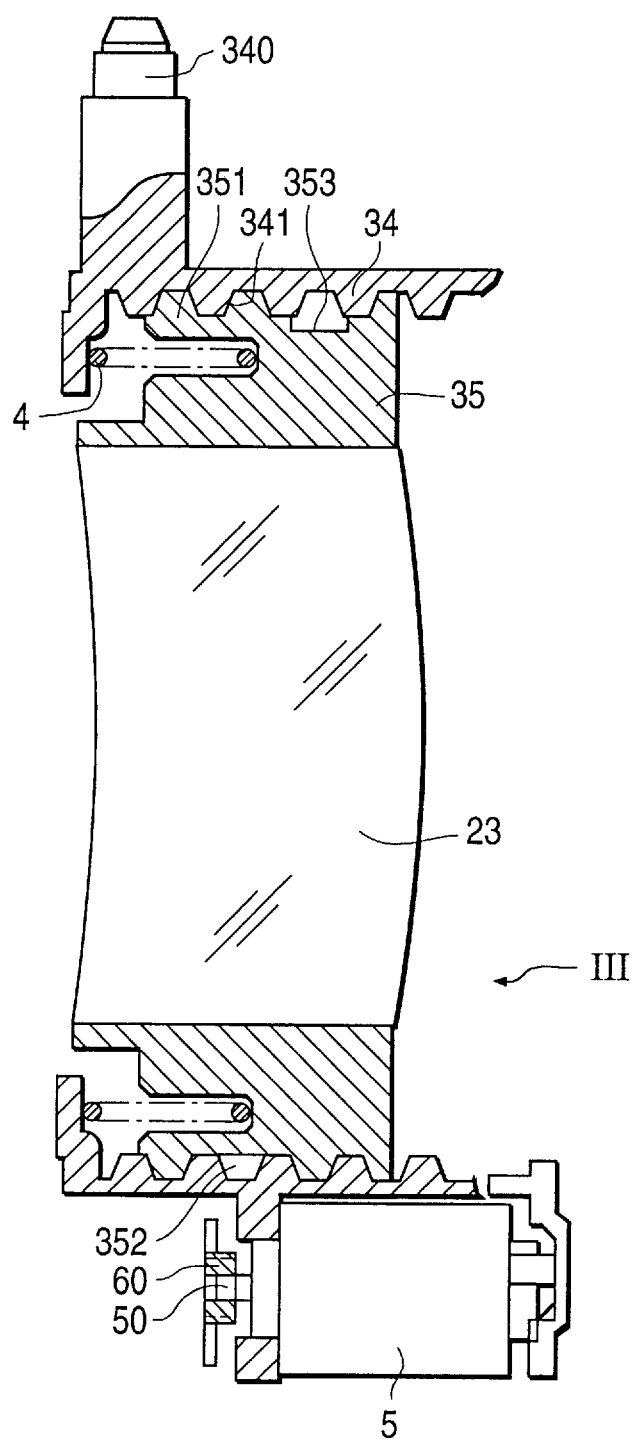
FIG. 2 is a cross sectional diagram along the II—II line in FIG. 1.
Figure 3:
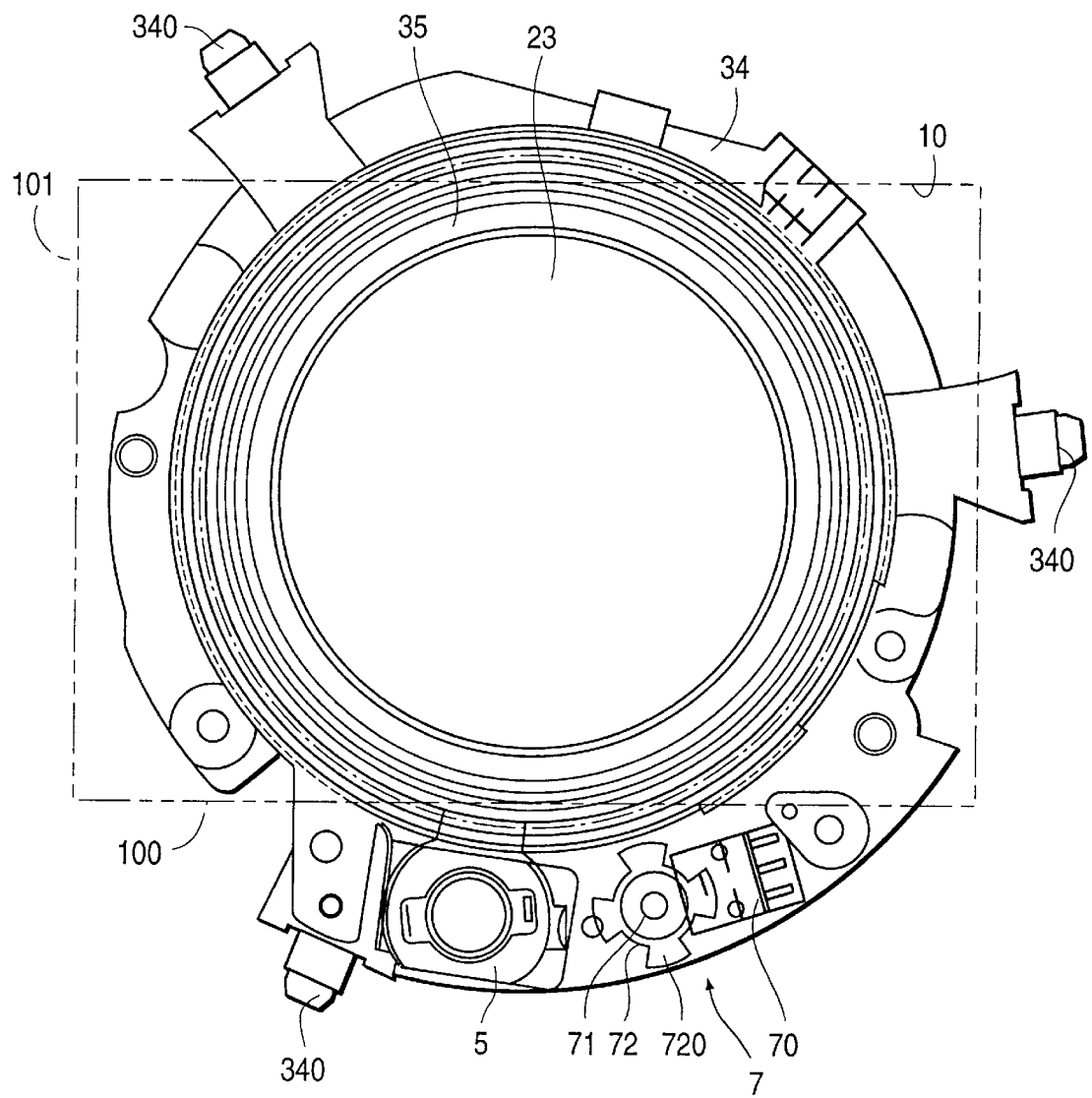
FIG. 3 is a back view diagram of the surrounding area of the third lens group seen from the direction of arrow III in FIG. 2.

Lens retention barrel 33 is movable in the direction of the optical axis and is provided with female helicoid member 34 which is retained on outer barrel 30 in a space, and male helicoid member 35 which is arranged on the internal circumference side thereof, and third lens group 23 described above is fixed on the inner circumference of male helicoid member 35. The details surrounding these helicoid members 34 and 35 are indicated in FIGS. 1–3. On the outer circumference of female helicoid member 34 are three pins 340 which match grooves 300 (see FIG. 7) of the optical axis direction which are provided on outer barrel 30, and which prevent the rotation of female helicoid member 34 around optical axis AX, and which guide female helicoid member 34 in the optical axis direction.

Spiral screw groove 341 is formed on the inner circumference of female helicoid member 34, and spiral screw thread 351 of male helicoid member 35 mates with this screw groove 341. Male helicoid member 35 together with third lens group 23 moves in the direction of the optical axis by rotating helicoid member 35 centering on optical axis AX in relation to female helicoid member 34, and the focus position of photographic lens 2 is adjusted by varying the distance between third lens group 23 and the other lens groups 21 and 22 (see FIG. 7). As indicated in detail in FIG. 2, compression springs 4 are installed between both helicoid members 34 and 35, and prevent rattling between helicoid members 34 and 35 based on the fact that screw grooves 341 and screw threads 351 make constant contact in a fixed direction based on the pressing force of compression springs 4.

Actuator 5 is attached to the lower part of female helicoid member 34 as a drive source that causes male helicoid member 35 to rotate. A variety of devices may be used for actuator 5 to produce a drive force, such as a DC motor, an ultrasonic wave motor, etc.

The rotation of output axis 50 of actuator 5 is transmitted to male helicoid member 35 based on geared wheel array 6. As indicated in detail in FIG. 4, wheel array 6 is comprised of pinion gear 60 which is installed on output axis 50 of actuator 5, multiple intermediate gears 61–65 which transmit the rotation of pinion gear 60 to the male helicoid member 35 side, and final gear 66. Intermediate gears 61–65 and final gear 66 are installed to rotate independently on female helicoid member 34. As indicated in FIG. 1 and in FIG. 4, final gear 66 protrudes from the inner circumference side of female helicoid member 34 via through-hole 343 provided on female helicoid member 34, and meshes with geared surface 352 formed on the outer circumference of male helicoid member 35. As shown in further detail in FIG. 5 and in FIG. 6, geared surface 352 is formed on the lead edge (outer circumference) of screw threads 351 of male helicoid member 35 so as to follow in the direction of its twisting. Male helicoid member 35 rotates in relation to female helicoid member 34 based on the rotation of final gear 66.

Figure 4:
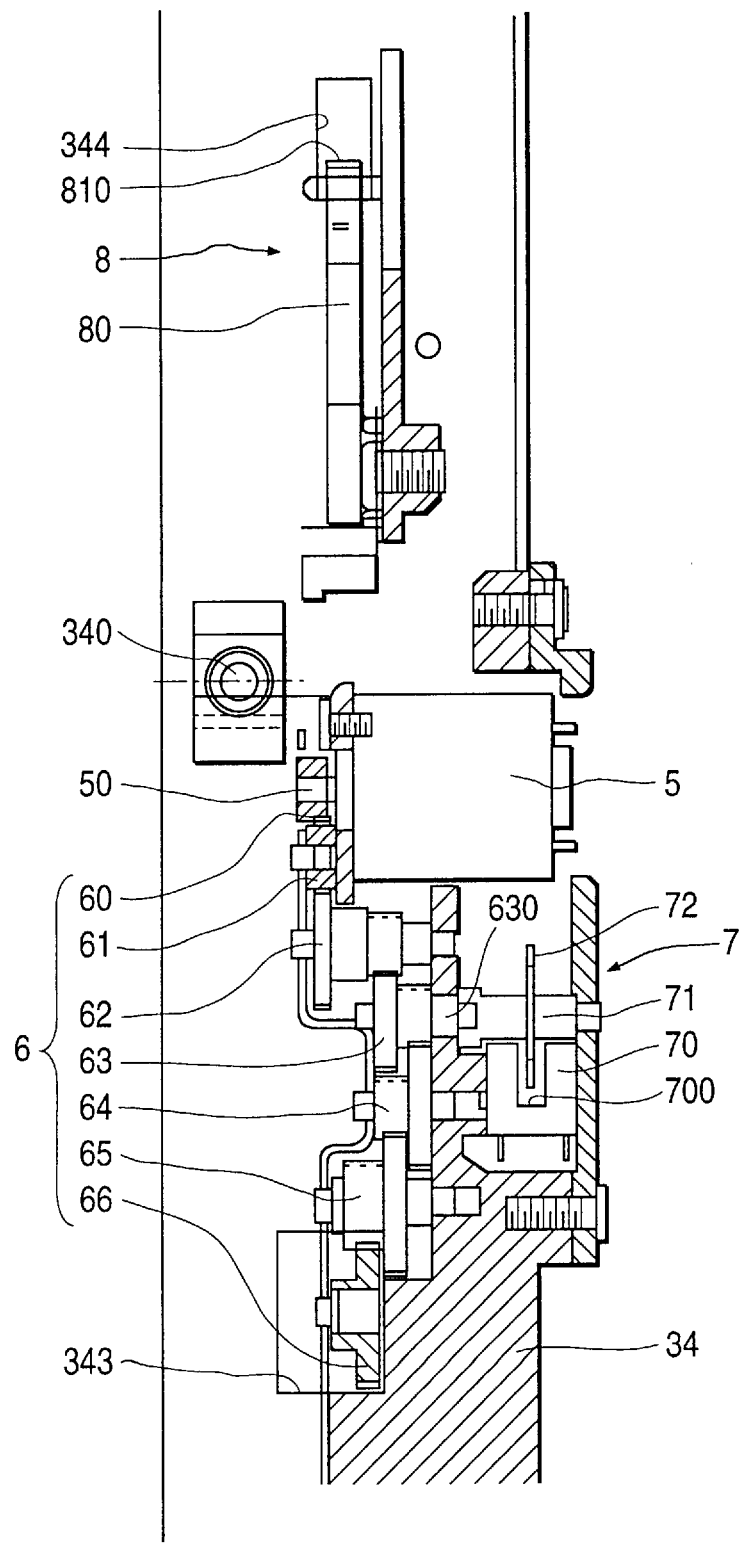
FIG. 4 is a diagram indicating a close-up development of a gear wheel array seen from the direction of arrow IV in FIG. 1.

As indicated in FIGS. 3 and 4, drive amount detection mechanism 7, which detects the amount of drive of third lens group 23, is provided on the opposite side in relation to geared wheel array 6 of female helicoid member 34. This drive amount detection mechanism 7 has photo-interrupter 70 which is fixed on female helicoid member 34, rotational axis 71 which is supported by female helicoid member 34 so as to be able to rotate, and shade plate 72 that is installed on rotation axis 71. The axle end of rotational axis 71 is connected to the same axis as axis 630 of intermediate gear 63, and intermediate gear 63 and shade plate 72 are capable of rotation as a single body.

Blades 720 pass through slits 700 of photo-interrupter 70 in succession based on the rotation of shade plate 72, and pulse signals of a number proportional to the amount of drive of third lens group 23 in the direction of the optical axis are output from photo-interrupter 70. The output signals from photo-interrupter 70 are input into the control device, not indicated in the diagram, and are utilized as information for the purpose of controlling the positions of third lens group 23 in the direction of the optical axis.

As indicated in FIGS. 1 and 3, actuator 5, geared wheel array 6 and drive amount detection mechanism 7 described above are arranged to be concentrated in a position on the long side 100 of rectangular shape aperture 10 and, moreover, in a position on the lower side of the camera.

Also, as indicated in FIG. 1, standard position detection mechanism 8 which detects the standard position of third lens group 23 in the optical axis direction is provided in a position which is on the outer circumference of female helicoid member 34 and on the short side 101 of aperture 10. This standard position detection mechanism 8 has a pair of continuity contact members 80 and 81 which are fixed to female helicoid member 34. Bending member 810 is formed on the lead edge side of continuity contact member 81. As indicated in FIG. 4 and in FIG. 5, bending member 810 protrudes out at the inner circumference side of female helicoid member 34 via through-hole 344 of male helicoid member 34, and contacts the lead edge (outer circumference) of screw threads 351 of male helicoid member 35. Continuity contact members 80 and 81 make contact, and continuity is maintained between the two.

Figure 5:
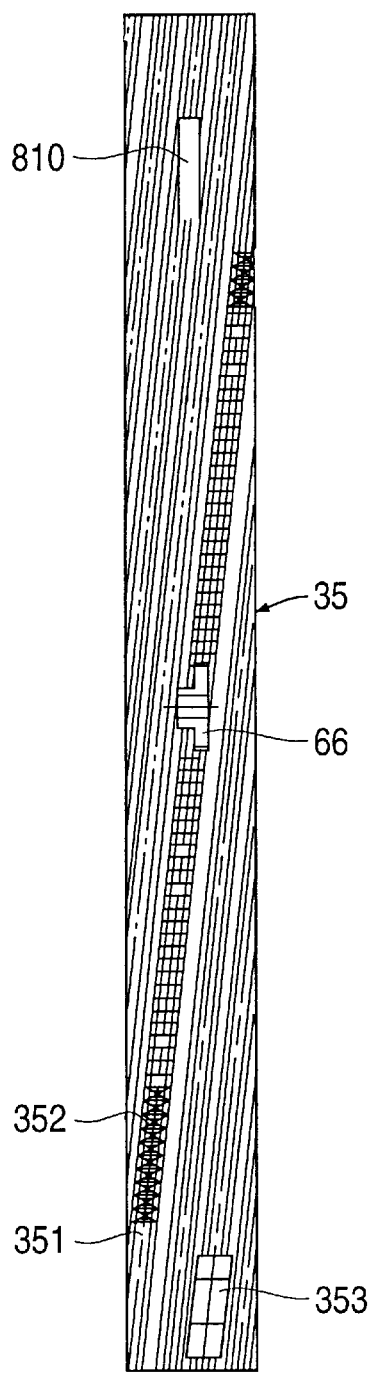
FIG. 5 is a development diagram of the outer circumference of a male helicoid member depicted in FIG. 1.
Figure 6:
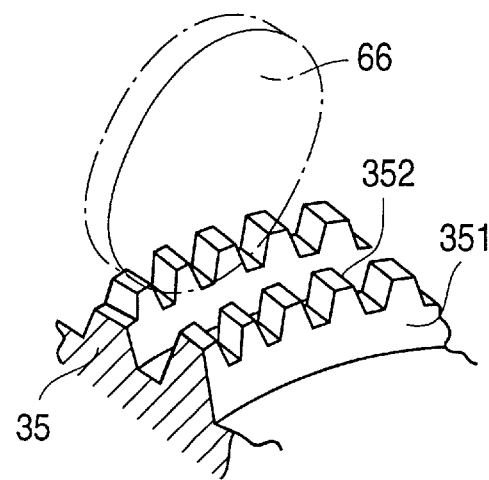
FIG. 6 is a perspective angle view of the outer circumference of a male helicoid member depicted in FIG. 1.
Figure 8:
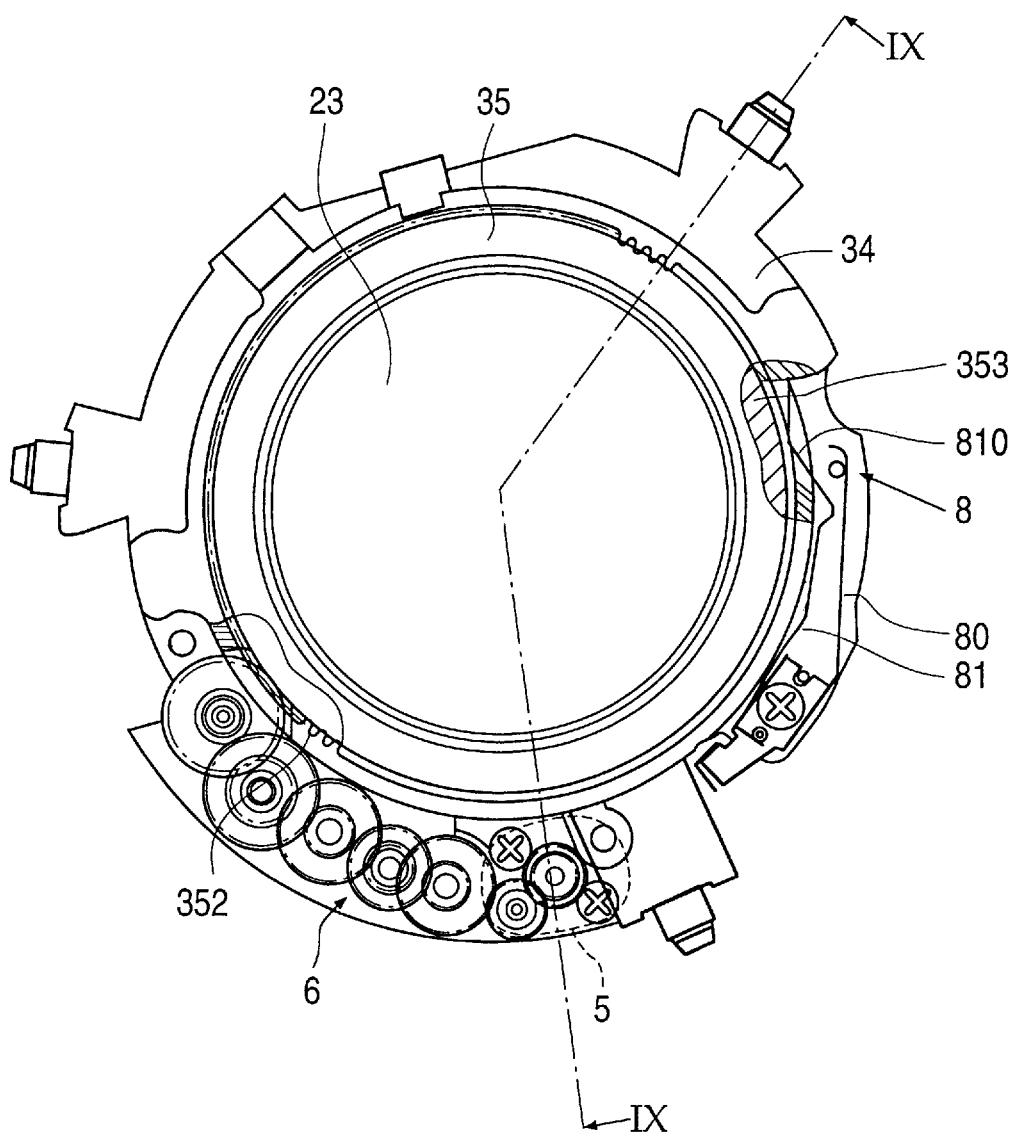
FIG. 8 is a diagram indicating the mode in which the third lens group depicted in FIG. 1 is in the standard position.
Figure 9:
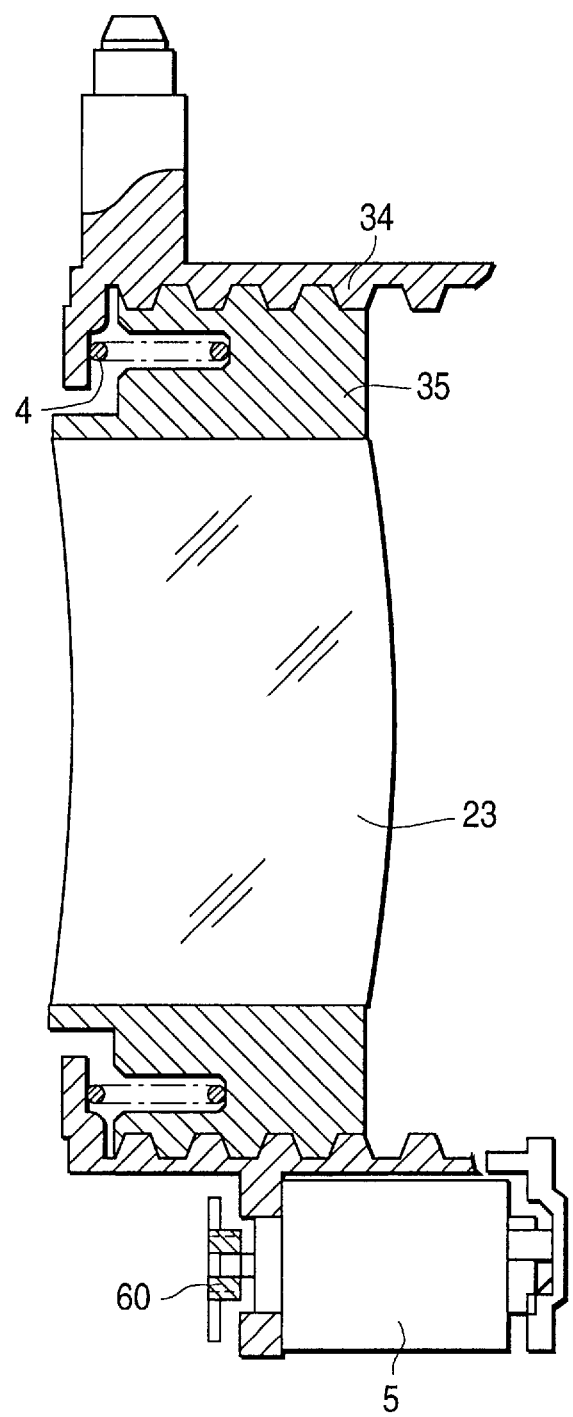
FIG. 9 is a cross sectional diagram along the line IX—IX in FIG. 8.
Figure 10:
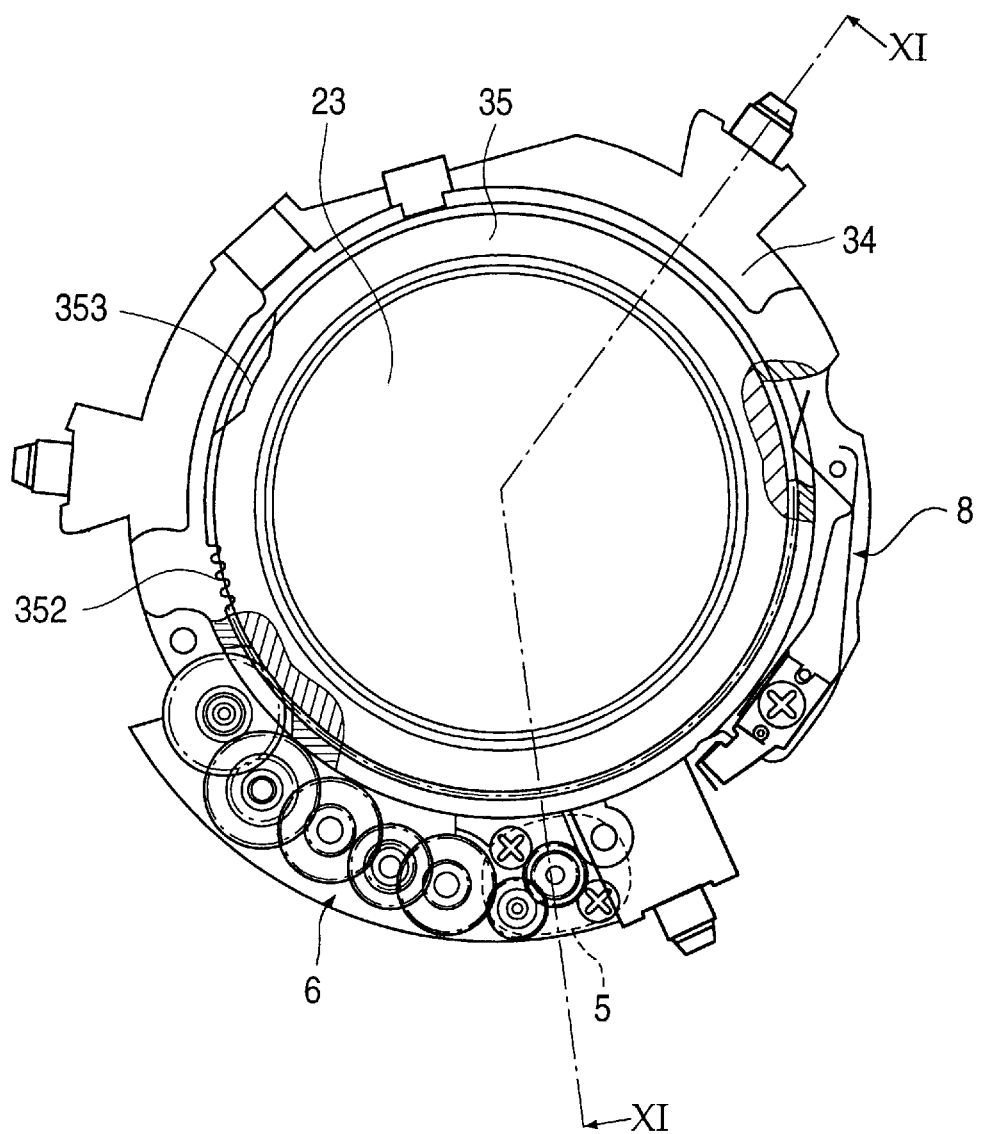
FIG. 10 is a diagram indicating the mode in which the third lens group of FIG. 1 has been moved from the standard position.
Figure 11:
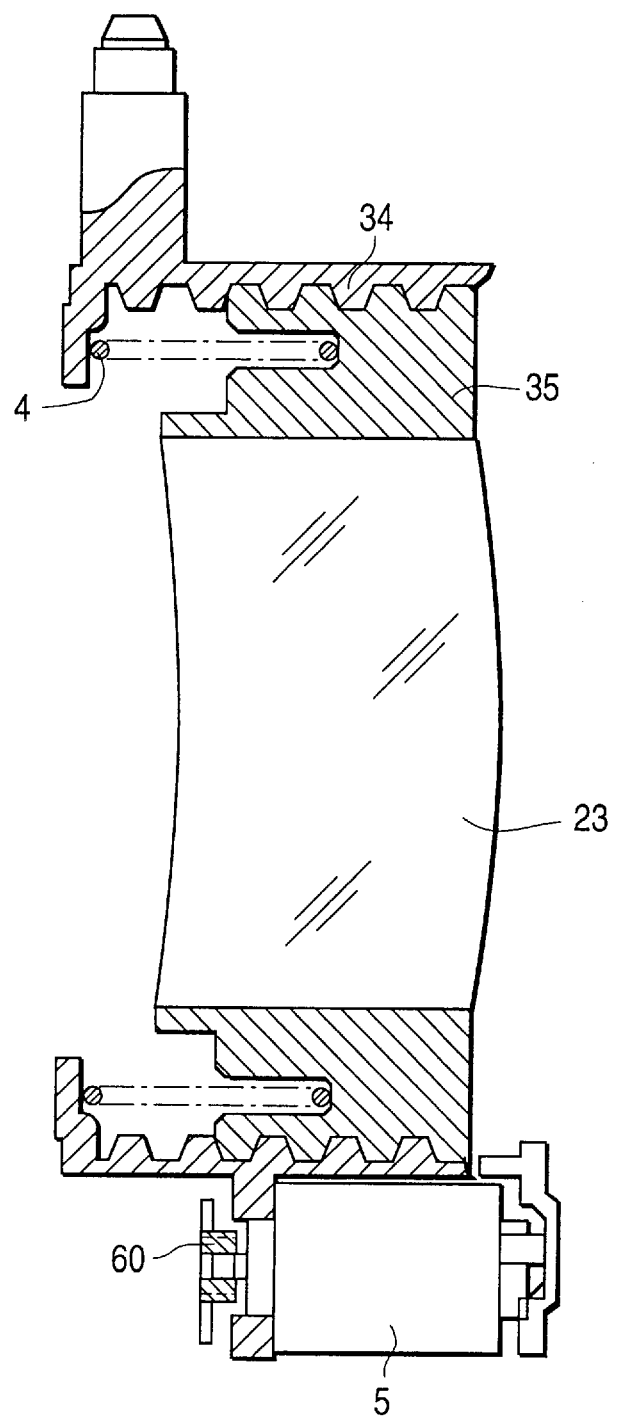
FIG. 11 is a cross sectional diagram taken along the line XI—XI in FIG. 10.

As indicated in FIGS. 1, 2 and 5, notch 353 is formed in one location on screw thread 351. When male helicoid member 35 rotates in relation to female helicoid member 34, screw thread 351 swings in relation to bending member 810. Then, as indicated in FIG. 8, when notch 353 extends into the position of through hole 344 of female helicoid member 34, bending member 810 falls into notch 353, continuity between continuity contact members 80 and 81 is broken, and the standard position of third lens group 23 is detected. This standard position can be set at any position in the movable range of third lens group 23, but as indicated in FIG. 9, in the present embodiment, the standard position is taken to be the position of the maximum advance of male helicoid member 35 in relation to female helicoid member 34, specifically, the position in which third lens group 23 makes closest contact with second lens group 22 (see FIG. 7).

If the number of output pulses of photo-interrupter 70 from the standard position is counted, the position of third lens group 23 in the direction of the optical axis can be interpolated. FIG. 1 and FIG. 2 indicate the state when photographic lens 2 has been brought into focus in relation to an infinitely distant subject. Moreover, FIG. 10 and FIG. 11 indicate when photographic lens 2 is brought into focus in relation to a close up distance.

As explained above, in the present embodiment, because actuator 5, geared wheel array 6, drive amount detection mechanism 7 and standard position detection mechanism 8, which are indispensable for the focus adjustment operation of driving third lens group 23, are all on the outer circumference of third lens group 23, there is no concern that these mechanisms will block the light fluxes that are incident from third lens group 23. Because actuator 5 itself is positioned near third lens group 23 which is the driven lens group, the distance from actuator 5 through geared wheel array 6 up to third lens group 23 is short, and mechanical loss and drive error can be minimized. Because drive amount detection mechanism 7 is also arranged in the vicinity of geared wheel array 6, it is not necessary to transmit the rotation of actuator 5 and geared wheel array 6 from third lens group to a position separated at a distance, and these mechanisms can be consolidated compactly. Because the long side 100 of aperture 10 has more leeway in its space than does short side 101, there is no waste in the layout of camera body space, and the camera can be made compact by efficiently using the empty space.

Moreover, because actuator 5, geared wheel array 6, drive amount detection mechanism 7 and standard position detection mechanism 8 are all installed on female helicoid member 34, it is not necessary to provide parts to support these structures separately. Because geared surface 352 of male helicoid member 35 is provided on screw thread 351, it is not necessary to form a geared surface or provide a geared wheel at a position separated from screw thread 351 of male helicoid member 35, and male helicoid member 35 can be made small. Because notch 353 is provided on screw thread 351 of male helicoid member 35 and its presence or absence is detected by standard position detection mechanism 8, it is not necessary to provide a configuration in which the standard position of the notch, etc. is indicated in a position other than screw thread 351, and male helicoid member 35 and standard position detection mechanism 8 can be made small.

Additionally, in the present embodiment, because the amount of movement of third lens group 23 in the direction of the optical axis can be detected by drive amount detection mechanism 7, and the standard position of third lens group 23 can be detected by standard position detection mechanism 8, it is possible to either detect the distance to the subject and move third lens group 23 to the position corresponding to that value, or to calculate the amount of defocus of third lens group 23 corresponding to the amount of discrepancy of the subject image on the image plane in relation to the film plane, and drive third lens group 23 by only that amount. That is, in the former case, the standard position that standard position detection mechanism 8 detects is taken as the standard, and the amount of drive for third lens group 23 from that position may be detected by drive amount detection mechanism 7; and in the latter case, the current position (without asking whether or not there is a standard position) of third lens group 23 is taken as the standard, and the amount of drive for third lens group 23 from that position may be detected by drive amount detection mechanism 7. In the latter case, standard position detection mechanism 8 is not necessary. But, if standard position detection mechanism 8 is provided, the current position of third lens group 23 is interpolated, and the photographic distance corresponding to that position can be calculated, and that value may be used in exposure control, etc.

In the embodiment describe above, the focus adjustment optical system was configured by third lens group 23, the transmission mechanism was configured by geared wheel array 6, the drive gear wheel was configured by final gear 66 of gear wheel array 6, and the notch detection member was configured by continuity contact pieces 80 and 81. Additionally, dynamic transmission mechanisms such as belts, cams, and links may also be used for the transmission mechanisms.

As explained above, with the embodiment of the present invention as just described, there is no concern that the light fluxes incident from the photographic lens and conducted to the aperture will be blocked by the actuator, the transmission mechanism or the drive amount detection mechanism. These mechanisms can be configured compactly by effectively using the empty space of the camera and the camera can be made quite small. Mechanical loss and error during drive of the focus adjustment optical system can be reduced by shortening the distance from the actuator through the transmission mechanism up to the focus adjustment optical system.

Moreover, the present embodiment of the invention as just described provides that the camera can be made altogether smaller by reducing the number of parts around the focus adjustment optical system. Additionally, because the geared surface for the purpose of causing the male helicoid member to rotate is formed on the screw thread, the male helicoid member can be made in a smaller configuration. Also, the embodiment of the present invention provides the advantages that there is no concern that the light fluxes incident from the photographic lens and conducted to the aperture are blocked by the standard position detection mechanism, and the standard position detection mechanism can be consolidated compactly in the vicinity of the focus adjustment optical system. And, because the notch for the purpose of detecting the standard position of the focus adjustment optical system is provided on the screw thread of the male helicoid member, the standard position detection mechanism and the male helicoid member can be made quite small.

Referring now to FIGS. 12–15, therein depicted is a second embodiment of the present invention.

Figure 12:
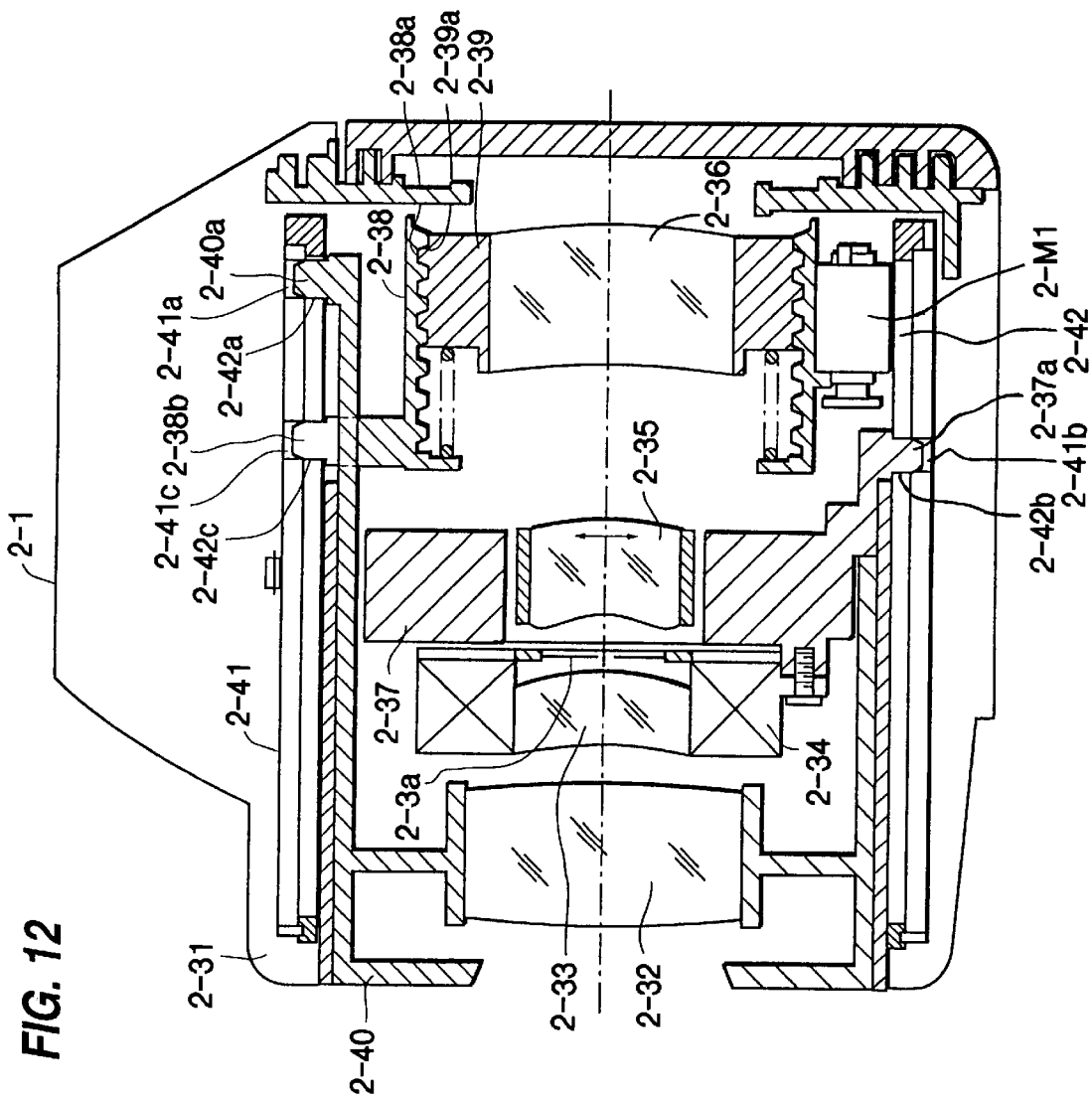
FIG. 12 is a cross-sectional diagram of a camera not in use, and indicates an embodiment of a camera with a vibration compensation function relating to the present invention.
Figure 13:
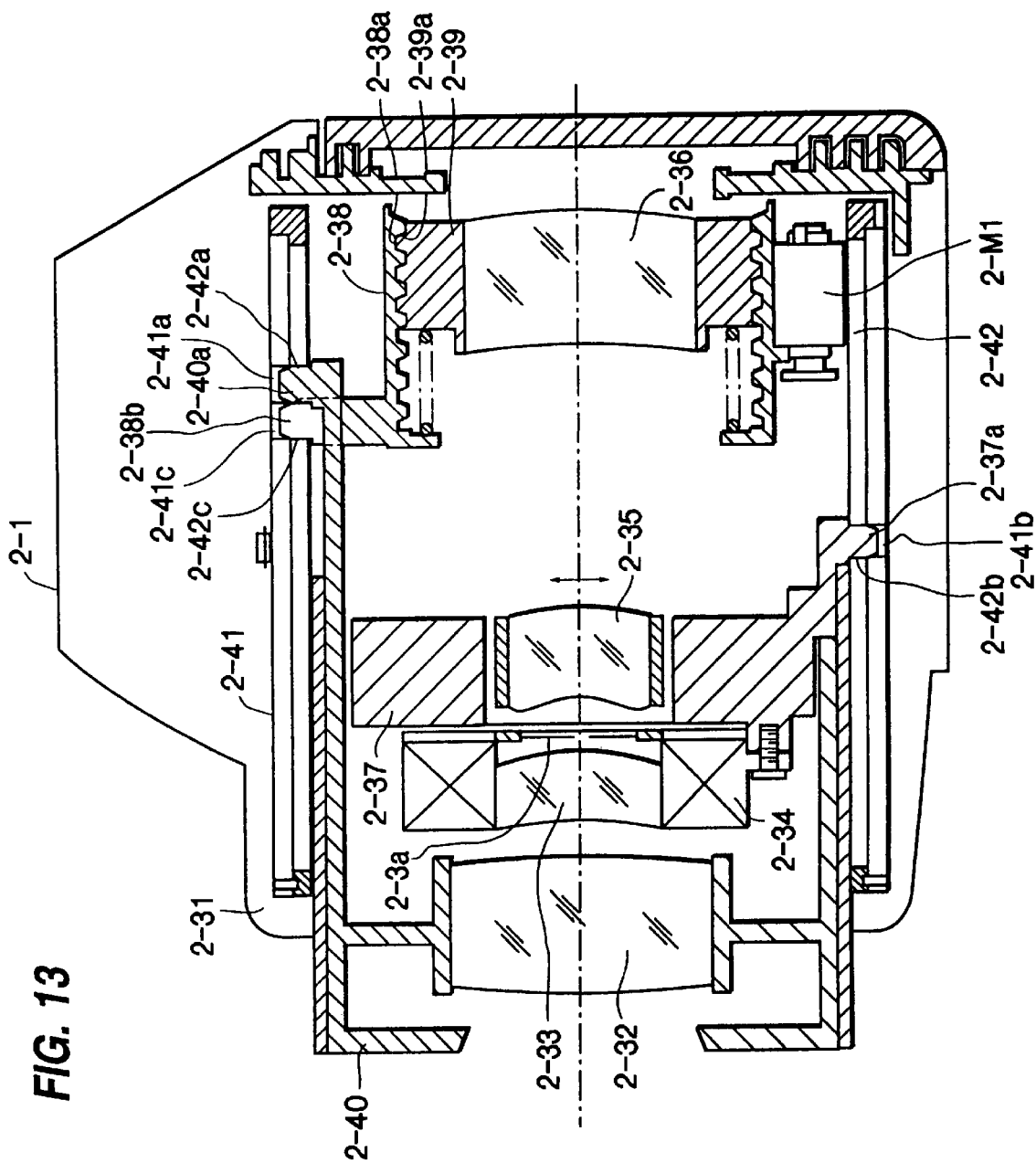
FIG. 13 is a cross-sectional diagram of a camera with a vibration compensation function of FIG. 12 in the wide angle photography mode.
Figure 14:
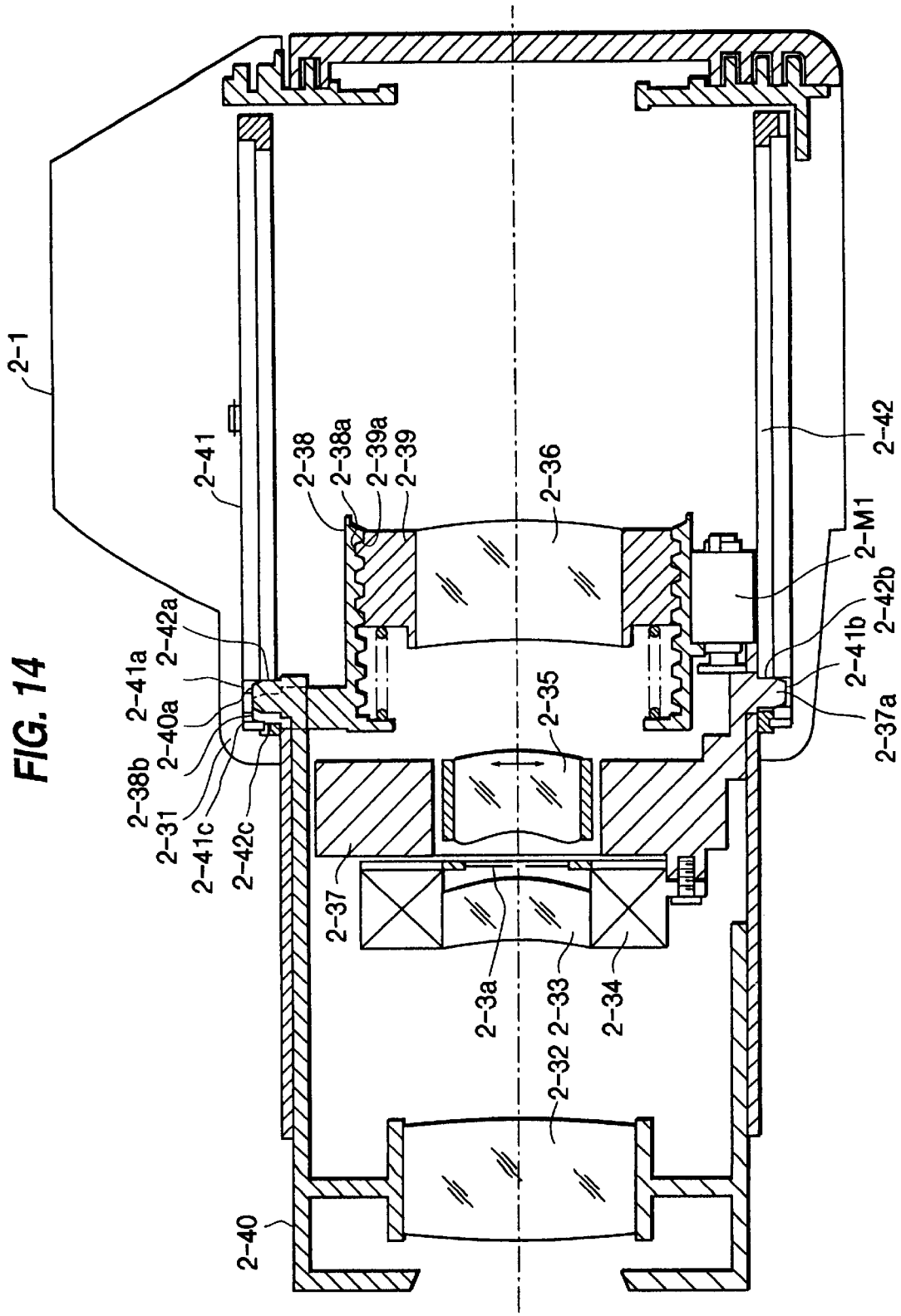
FIG. 14 is a cross-sectional diagram of a camera with a vibration compensation function of FIG. 12 in the telephotographic mode.

FIG. 12, FIG. 13 and FIG. 14 indicate one embodiment of a camera with a vibration compensation function relating to the present invention, and among these diagrams, FIG. 12 indicates the camera when not in use (in the state in which the power source switch is OFF); FIG. 13 indicates when the camera is in use (the state in which the power source switch is ON) and the lens barrel is in the wide angle photography state based on the variable power device; and FIG. 14 indicates when the camera is likewise in use, and the lens barrel is in the telephoto state.

First, a brief description will be given of the configuration of the entire camera as shown in these FIGS. As shown in these FIGS, the camera include camera body 2-1.

A zoom type photographic lens barrel 2-31 has a lens retention barrel 2-40 provided in the central part of the front side of camera body 2-1 so as to freely extend or be housed, and this lens barrel 2-31 holds photographic lens groups 2-32, 2-33, 2-35, and 2-36. In addition, shutter drive mechanism 2-34 is installed on photographic lens group 2-33 which is the second lens group.

Moreover, photographic lens group 2-35, which is the third lens group, functions as the image vibration compensation lens group, and is made so that it can be driven in the direction generally perpendicular to the optical axis by vibration compensation lens drive mechanism 2-37 based on vibration detection information from a vibration detection sensor, which is not indicated in the diagram.

Lens retention barrel 2-40 retains photographic lens group 2-32 which is the first lens group. Cam pin 2-40a, which meets with cam groove 2-41a of cam barrel 2-41 and with direct advance groove 2-42a of direct advance guide barrel 2-42, is provided on this lens retention barrel 2-40.

The aforementioned shutter drive mechanism 2-34 executes exposures by receiving signals from a CPU (not indicated in the diagram) for the aperture diameter and the opening time of the shutter, and then drives shutter 2-3a. Also, the aforementioned vibration compensation lens drive mechanism 2-37 executes vibration control by driving photographic lens group 2-35 for vibration compensation in the direction generally perpendicular to the optical axis based on the signals from the CPU (not indicated in the diagram). Cam pin 2-37a, which matches with cam groove 2-41b and direct drive groove 2-42b, is provided on the outer circumference part of the vibration compensation lens drive mechanism 2-37.

A lens retention frame 2-39 retains photographic lens group 2-36 which is the fourth lens group. Helicoid screw 2-39a is formed on the outer circumference part of lens retention frame 2-39, meshes with helicoid screw 2-38a of the inner circumference part of helicoid barrel 2-38, and focusing operation is conducted by lens retention frame 2-39 rotating based on motor 2-M1. Cam pin 2-38b, which matches with cam groove 2-41c and direct drive groove 2-42c, is provided on the outer circumference part of helicoid barrel 2-38.

Figure 15:
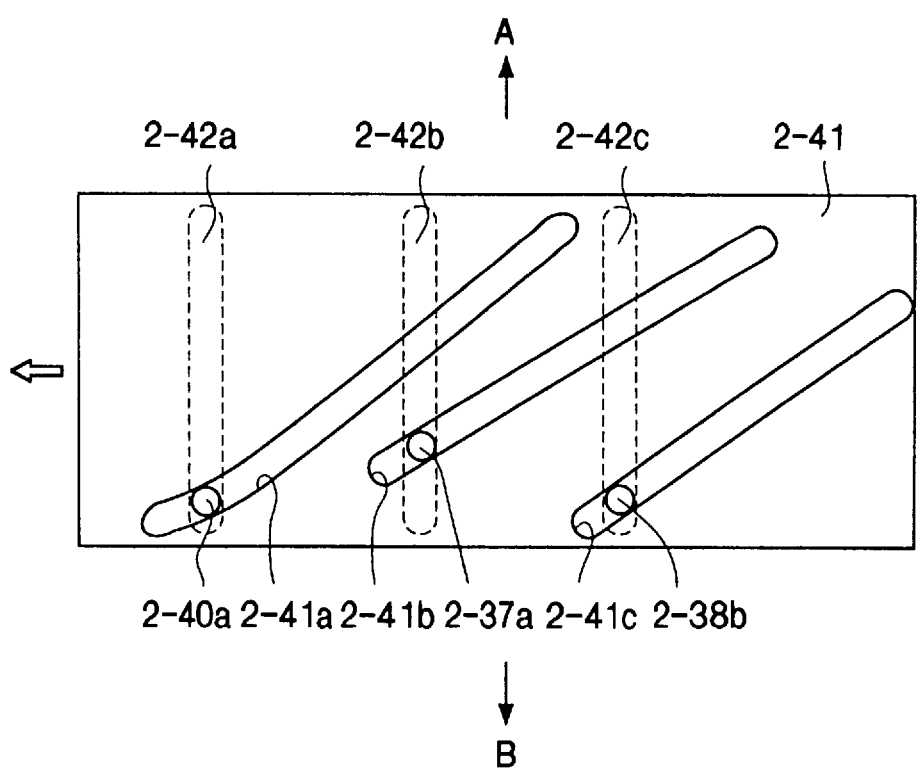
FIG. 15 is a diagram of the cam barrel and the direct advance guide barrel which compose the variable power device that is applied to a camera with a vibration compensation function of FIG. 12.

The aforementioned cam barrel 2-41, as indicated in FIGS. 12–14, is retained on direct drive guide barrel 2-42 so as to be able to rotate centered on the optical axis of the photographic optical system. Then, cam barrel 2-41, as indicated in FIG. 15, has cam grooves 2-41a, 2-41b, and 2-41c for the purpose of determining the position of photographic lens groups 2-32, 2-33, 2-35 and 2-36. Also, the aforementioned direct drive guide barrel 2-42 has direct drive grooves 2-42a, 2-42b, and 2-42c for the purpose of changing so as to be able to advance without photographic lens groups 2-32, 2-33, 2-35 and 2-36 rotating. The direct advance guide barrel 2-42 is secured in camera body 2-1.

More specifically, FIG. 15 indicates the state of a camera with a vibration compensation function according to the second embodiment of the present invention in which cam barrel 2-41 and direct advance guide barrel 2-42, which comprise the variable power device for the purpose of changing the focus distance using the photographic lens groups, is developed in the up and down directions of FIG. 12.

As is clearly indicated in FIG. 15, when cam barrel 2-41 is made to rotate around the center of the optical axis, cam barrel 2-41 moves in the direction of the arrows shown in FIG. 15.

Cam grooves 2-41a, 2-41b, and 2-41c rotate accompanying the rotation of this cam barrel 2-41, and cam pin 2-40a, cam pin 2-47a and cam pin 2-38b, which are matched with cam grooves 2-41a, 2-41b, and 41c, move in the direction of the optical axis. For this reason, when cam barrel 2-41 is made to rotate, photographic lens groups 2-32, 2-33, 2-35 and 2-36 move respectively along cam grooves 2-41a, 2-41b, and 41c, the lens distance changes, and the focus distance can be varied.

As indicated in FIG. 15, when the camera is not in use, vibration compensation lens drive mechanism 2-37, which together with vibration compensation lens group 2-35 comprises the vibration compensation device, is inside camera body 2-1; and in the telephoto state indicated in FIG. 14, vibration compensation lens drive mechanism 2-37 is in a position that extends to the front from camera body 2-1.

Thus, a camera with a vibration compensation function based on the aforementioned configuration is configured such that the variable power device (2-41, 2-42) houses the vibration compensation device (2-37) inside the main cover of camera body 2-1 when the camera is not in use and the power source switch is OFF, and the vibration compensation device is extended to a position outside the main cover of camera body 2-1 in the specified region within the range of variable power operation when the camera is being used and the power source switch is ON. Thus, the entire camera can be made compact, while guaranteeing the vibration compensation functions and the photographic operations required of the lens barrel from a wide angle position to a telescopic position.

Also, with the aforementioned configuration, vibration compensation lens drive mechanism 2-37 executes precise and sensitive operations and is housed inside the main cover of camera body 2-1 when the camera is not in use, and therefore it can be protected in relation to shocks and vibration from outside of the camera.

Moreover, in the configuration described above, because it is arranged so as to have connecting cams (cam grooves 2-41a, 2-41b, 2-41c of cam barrel 2-41) in which the variable power device (2-41, 2-42) together with photographic lens groups 2-32, 2-33, 2-35, and 2-36 can be moved from the housed position to the position of maximum protrusion from the front of the camera, it is possible to suitably and reliably obtain the required movement of the lens barrel while the camera is made compact.

Additionally, the present invention is not limited to the structure of the embodiment shown in FIGS. 11–15 and described above, and it goes without saying that the shapes of the parts and the structures incorporated may be suitably modified and transformed. For example, a variety of configurations of the camera parts may be considered. Also, a variety of structures may be freely adopted for the vibration compensation device and the variable power device.

According to the preferred embodiments of a camera with a vibration compensation function related to the present invention as explained above, there is provided a variable power device to conduct the focus distance variable power operation based on the photographic lens groups by moving multiple photographic lens groups in the direction of the optical axis, and a vibration compensation device to execute vibration compensation corresponding to vibration detection signals of the vibration detection device that detects vibration. Additionally, the cameras described above may be configured such that a variable power device houses this vibration compensation device inside the main cover of a camera body when the camera is not in use, and causes the vibration compensation device to extend outside the main cover of the camera body in a specified region within the aforementioned variable power operational range when the camera is in use, and thus, even though it is a simple configuration, the following outstanding effects are obtained.

Specifically, according to the above embodiments of the present invention, the vibration compensation device, which comprises the vibration compensation lens and its drive mechanism, is housed inside the main cover of the camera body when the camera is not in use and the power source switch is OFF, and is extended to the front of the camera from the main cover of the camera body in the specified region in the variable power operational range when the camera is in use (photographic state) and the power source switch is ON. Thus, it is now possible to make the entire camera compact while providing both a vibration compensation function/unit and required photographic operations from a wide angle state to a telescopic state using a collapsible/expandable lens barrel.

Additionally, according to the preferred embodiments of the present invention, because the vibration compensation lens drive mechanism that executes precise and sensitive operations is in a position housed inside the main cover of the camera body when the camera is not in use, there is the advantage that it can be protected in relation to shocks from outside the camera.

Moreover, a camera with a vibration compensation function according to the preferred embodiments of the present invention is arranged such that, when the camera is being used and the power switch is ON, there is a connecting cam that makes it possible to move the variable power device together with the photographic lens group from the housed position to the most extended position in front of the camera, and therefore, even if the configuration is simple, the required operations of the lens barrel can be suitably and reliably obtained, and also a more compact camera can be achieved.

As such, although preferred embodiments of the present invention have been shown and described, it will be readily appreciated by those skilled in the art that many changes and modifications may be made to such preferred embodiments without departing from the principles and spirit of the present invention, the scope of which is defined in the appended claims and their equivalents.

What is claimed is:

1. A camera comprising:
   an optical system;
   a helicoid arrangement having a male helicoid member surrounded by a female helicoid member;
   an actuator generating a drive force which moves said optical system;
   a transmission mechanism transmitting said drive force from said actuator to said optical system; and
   a drive amount detection mechanism detecting an amount of drive of said optical system caused by said actuator,
   wherein said actuator, said transmission mechanism and said drive amount detection mechanism are disposed on said female helicoid member, on the outer circumference of said optical system, on a long side of an aperture that forms light fluxes into a rectangular shape to become incident on a film surface.

2. The camera according to claim 1, wherein a geared surface is formed on a screw thread of said male helicoid member, said geared surface following along the spiraling direction of said screw thread and wherein said transmission mechanism is meshed with said geared surface of said male helicoid member and is rotationally driven by said actuator.

3. The camera according to claim 1, further comprising:
   a standard position detection mechanism detecting a standard position in the optical axis direction of said optical system, said standard position detection mechanism being provided on the outer circumference of said optical system.

4. The camera according to claim 3,
   wherein said male helicoid member having a screw thread section and wherein a notch is formed therein to indicate a standard position for said optical system; and
   wherein said standard position detection mechanism is provided with a notch detection member to detect whether said notch of said male helicoid member is present at a stipulated position on said female helicoid member.

5. A camera comprising:
   a variable power device conducting focus distance variable power operations based on multiple photographic lens groups by moving said multiple photographic lens groups in a direction of their optical axes;
   a vibration detection device to detect a camera vibration and to generate vibration signals in relation thereto; and
   a vibration compensation device to correct vibration corresponding to the vibration detection signals from the vibration detection device,
   wherein the variable power device houses said vibration compensation device inside a main cover of a camera body when the camera is not in use and wherein the vibration compensation device is made to extend to a position outside of the main cover of the camera to a specified region when the camera is in use.

6. The camera according to claim 5, wherein the specified region is in the area of the variable power device operational range when the camera is in use.

7. The camera according to claim 5, wherein the variable power device comprises connecting cams that can be moved from a position housed together with said multiple photographic lens groups when the camera is not in use to a fully extended position when the camera is in use.

8. The camera according to claim 5, wherein said multiple photographic lens groups and said vibration compensation device are housed and positioned within the main cover of the camera body when the camera is not in use and wherein said multiple photographic lens groups and vibration compensation device extend out from the main cover of the camera body when the camera is in use.

9. A camera comprising:
   first and second lens groups positioned along an optical axis said second lens group being closest to an image forming plane;
   a lens holder holding said second lens group, said holder having an external spiral screw groove;
   a helicoid member positioned on an external circumference of said lens holder and having an internal spiral screw groove mated with the external spiral screw groove of said lens holder; and
   a drive device changing a distance between said first lens group and said second lens group, said drive device including an actuator and a displacement transmission device,
   wherein said drive device is fixed to said helicoid member so as to be exterior of the circumference of said second lens group.

10. The camera according to claim 9, wherein said image forming plane has an aperture that forms a four-sided photographic plane and comprises two long sides and two short sides and wherein said drive device is positioned adjacent a long side of said two long sides.

11. A camera comprising:
    an optical system;
    an actuator generating a drive force which moves said optical system, said actuator moving with said optical system;

a transmission mechanism transmitting said drive force from said actuator to said optical system, said transmission mechanism having a plurality of intermediate gears;

a guide barrel surrounding said actuator, said optical system and said actuator adapted to move through said guide barrel; and a drive amount detection mechanism detecting an amount of drive of said optical system caused by said actuator, wherein said actuator, said transmission mechanism and said drive amount detection mechanism are disposed in said camera in a position which is on the outer circumference of said optical system and which is on a long side of an aperture that forms light fluxes into a rectangular shape to become incident on a film surface.

12. A camera comprising:

a helicoid arrangement having a male helicoid member and a female helicoid member, an optical system arranged on the inner circumference side of said male helicoid member;

an actuator generating a driving force which moves said optical system, said actuator disposed on said female helicoid and moving with said optical system;

a transmission mechanism disposed on said female helicoid member and transmitting said drive force from said actuator to said optical system;

a guide barrel surrounding said actuator, said optical system and said actuator adapted to move through said guide barrel; and a drive amount detection mechanism disposed on said female helicoid member and detecting a an amount of drive of said optical system caused by said actuator, wherein said actuator, said transmission mechanism and said drive amount detection mechanism are disposed in said camera in a position which is on the outer circumference of said optical system and which is on a long side of an aperture that forms light fluxes into a rectangular shape to become incident on a film surface.

\* \* \* \* \*